(12) United States Patent
Goodzeit et al.

(10) Patent No.: US 10,913,551 B1
(45) Date of Patent: Feb. 9, 2021

(54) FAULT-TOLERANT SCALABLE HIGH THRUST SPACECRAFT PROPULSION

(71) Applicant: Lockheed Martin Corporation, Bethesda, MD (US)

(72) Inventors: Neil Evan Goodzeit, Woodside, CA (US); John B. Henderson, Littleton, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 310 days.

(21) Appl. No.: 15/896,919

(22) Filed: Feb. 14, 2018

(51) Int. Cl.
*B64G 1/40* (2006.01)
*B64G 1/26* (2006.01)
*B64G 1/00* (2006.01)

(52) U.S. Cl.
CPC .............. *B64G 1/401* (2013.01); *B64G 1/007* (2013.01); *B64G 1/26* (2013.01); *B64G 1/402* (2013.01)

(58) Field of Classification Search
CPC .......... B64G 1/26; B64G 1/401; B64G 1/403; B64G 1/404; B64G 1/405; B64G 1/24
See application file for complete search history.

(56) References Cited

U.S. PATENT DOCUMENTS

| | | | | |
|---|---|---|---|---|
| 3,807,657 A | * | 4/1974 | Brill | B64G 1/401 244/1 R |
| 4,725,024 A | * | 2/1988 | Vorlicek | B64G 1/244 244/164 |
| 6,082,678 A | * | 7/2000 | Maute | B64G 1/007 244/164 |
| 6,464,174 B1 | * | 10/2002 | Turner | B64G 1/007 244/158.6 |
| 6,908,064 B2 | * | 6/2005 | Goodzeit | B64G 1/26 244/169 |
| 7,370,834 B2 | * | 5/2008 | Scott | B64G 1/007 244/172.4 |
| 7,484,692 B1 | * | 2/2009 | McKinney | B64G 1/002 244/158.9 |
| 7,762,498 B1 | | 7/2010 | Henderson et al. | |
| 9,180,984 B2 | * | 11/2015 | Peterka, III | B64G 1/242 |
| 9,963,250 B2 | * | 5/2018 | Bultel | B64G 1/40 |
| 10,287,036 B2 | * | 5/2019 | Lichtin | F03H 1/0006 |
| 2015/0028159 A1 | | 1/2015 | Vichnin et al. | |
| 2016/0368624 A1 | * | 12/2016 | Hruby | B64G 1/26 |

* cited by examiner

Primary Examiner — Richard R. Green
Assistant Examiner — Arfan Y. Sinaki
(74) Attorney, Agent, or Firm — Morgan, Lewis & Bockius LLP

(57) ABSTRACT

Systems and methods of the present disclosure can be utilized to provide an improved propulsion system that uses multiple high efficiency engines to provide fault-tolerant and scalable high thrust for orbit transfer and maneuvering over life. An exemplary spacecraft includes a base panel, a cylindrical core member mounted to the base panel, multiple DV thrusters mounted within the cylindrical core member, and multiple reaction engine assemblies mounted to the base panel outside the cylindrical core member. Each of the DV thrusters has a thrust level that is greater than a thrust level of each of the reaction engine assemblies. The multiple DV thrusters are operated for velocity control, with attitude control being performed by off-pulsing at least one of the multiple DV thrusters.

17 Claims, 3 Drawing Sheets

PRIOR ART

FAULT-TOLERANT SCALABLE HIGH THRUST SPACECRAFT PROPULSION

STATEMENT REGARDING FEDERALLY SPONSORED RESEARCH OR DEVELOPMENT

Not applicable.

TECHNICAL FIELD

The present description relates in general to spacecraft propulsion systems, and in particular to, for example, without limitation, fault-tolerant scalable high thrust spacecraft propulsion systems.

BACKGROUND OF THE DISCLOSURE

Over the course of a mission, a Geosynchronous Earth Orbit (GEO) spacecraft performs a variety of velocity changes and attitude adjustments to achieve and maintain proper positioning. A typical GEO spacecraft includes a single Liquid Apogee Engine (LAE) with high thrust capabilities used for orbit transfer. Additional, medium thrust engines may be provided as a backup to the LAE or for on-orbit relocation maneuvers. Also, low thrust engines may be provided for attitude control.

Future spacecraft will require fault-tolerant, high thrust and fuel-efficient propulsion for orbit transfer, relocations, and other operations throughout the life of a spacecraft. Also, systems are needed with reduced cost and production time.

The description provided in the background section should not be assumed to be prior art merely because it is mentioned in or associated with the background section. The background section may include information that describes one or more aspects of the subject technology.

BRIEF SUMMARY OF THE DISCLOSURE

Systems and methods of the present disclosure can be utilized to provide an improved propulsion system that uses multiple high efficiency engines to provide fault-tolerant and scalable high thrust for orbit transfer and maneuvering over life. Such a system provides robust propulsion with several engines that are integrated into the spacecraft with reduced cost and production time. The system provides redundancy by allowing operation of a subset of remaining engines when an engine has failed. The implementation of multiple high thrust bipropellant engines reduces reliance on less efficient engines, such as monopropellant engines. The high thrust engines can be used for velocity control and referred to as Delta V thrusters ("DV thrusters" of "DV thrusters").

Various examples of aspects of the disclosure are described below as clauses for convenience. These are provided as examples, and do not limit the subject technology.

Clause A. A spacecraft including a base panel, a cylindrical core member mounted to the base panel, multiple DV thrusters mounted within the cylindrical core member, and multiple Reaction Engine Assemblies (REAs) mounted to the base panel outside the cylindrical core member, wherein each of the DV thrusters has a thrust level that is greater than a thrust level of each of the REAs.

Clause B. A spacecraft including a base panel; a cylindrical core member mounted to the base panel, multiple bipropellant engines mounted within the cylindrical core member, multiple monopropellant engines mounted to the base panel outside the cylindrical core member, a fuel tank, an oxidizer tank, a fuel line connecting the fuel tank to the bipropellant engines and the monopropellant engines, and an oxidizer line connecting the oxidizer tank to the bipropellant engines.

Clause C. A method of maneuvering a spacecraft, the method including operating multiple DV thrusters mounted within a cylindrical core member of a spacecraft, wherein at least some of the multiple DV thrusters are offset from a central axis that intersects a center of mass of the spacecraft, and controlling an attitude of the spacecraft by off-pulsing at least one of the multiple DV thrusters.

Each of embodiments A, B, and C may have one or more of the following additional elements in any combination:

Element 1: a fuel tank, an oxidizer tank, a fuel line fluidly connecting the fuel tank to the DV thrusters and the reaction engine assemblies, and an oxidizer line fluidly connecting the oxidizer tank to the multiple DV thrusters.

Element 2: the fuel tank contains hydrazine ($N_2H_4$).

Element 3: the oxidizer tank contains dinitrogen tetroxide ($N_2O_4$).

Element 4: the multiple DV thrusters comprises at least four DV thrusters.

Element 5: a thrust level of each of the DV thrusters is between 20 pound-force and 50 pound-force.

Element 6: a thrust level of each of the REAs is between 1 pound-force and 10 pound-force.

Element 7: the DV thrusters are bipropellant engines.

Element 8: the REAs are monopropellant engines.

Element 9: each of the multiple DV thrusters has a common first thrust level, and each of the multiple REAs has a common second thrust level.

Element 10: the cylindrical core member surrounds a central axis of the spacecraft, the central axis intersecting a center of mass of the spacecraft.

Element 11: the multiple DV thrusters are offset from the central axis, wherein opposing pairs of the multiple DV thrusters are symmetrically opposite each other across the central axis.

Element 12: the oxidizer line is not connected to any engine outside the cylindrical core member.

Element 13: the fuel line and the oxidizer line connect to the bipropellant engines via the cylindrical core member.

Element 14: the controlling the attitude of the spacecraft further comprises operating at least one of multiple REAs mounted to a base panel outside the cylindrical core member, wherein each of the DV thrusters has a thrust level that is greater than a thrust level of each of the reaction engine assemblies.

Element 15: if one of the multiple DV thrusters has failed, operating at least one pair of the multiple DV thrusters that has not failed, the pair being symmetrically opposite each other across the central axis.

Element 16: the multiple DV thrusters have thrust vectors parallel to each other such that, when fired, each provides a moment arm to the spacecraft.

Element 17: each of the multiple DV thrusters has a thrust vector that passes through the center of mass of the spacecraft such that, when fired, each provides a nominal zero moment arm to the spacecraft.

The description in this summary section may provide some illustrative examples of the disclosure. This section is not intended to be a broad overview or to identify essential elements of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Future spacecraft will require fault-tolerant, high thrust, and fuel-efficient propulsion for orbit transfer, relocations, and other operations throughout life. Also, systems are needed with reduced cost and production time.

Figure 1:
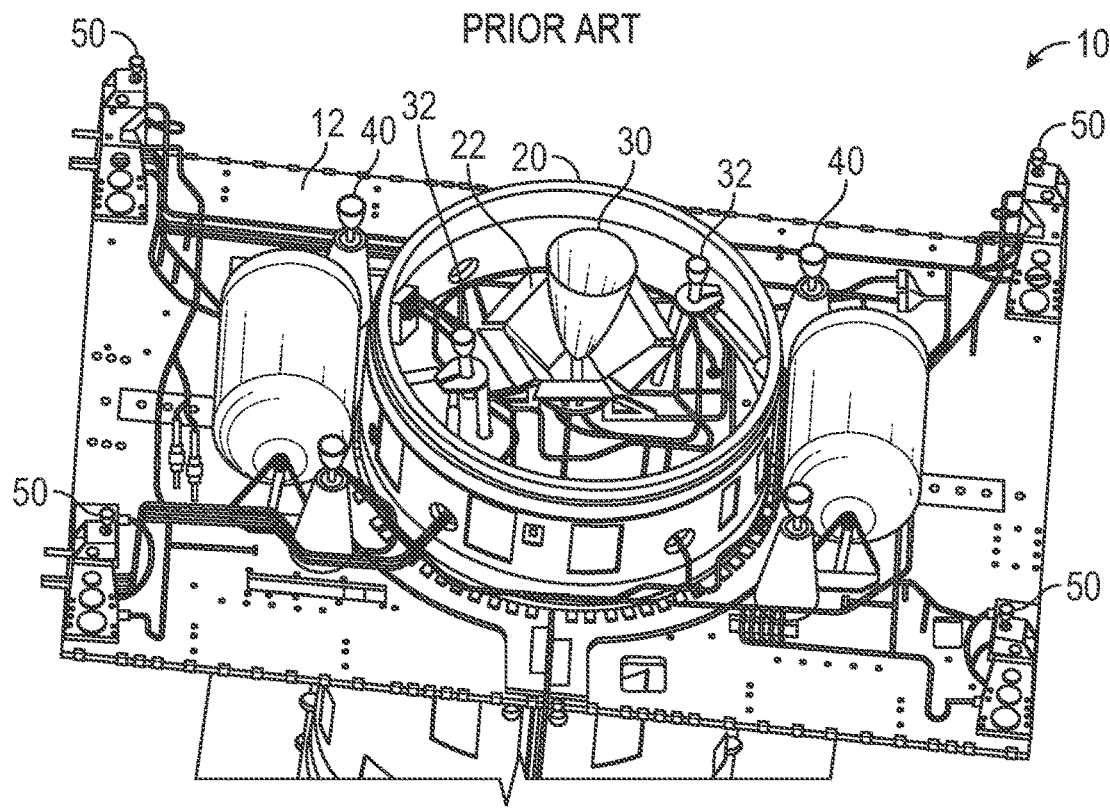
FIG. 1 shows a perspective view of an exemplary GEO spacecraft.

FIG. 1 shows a typical geosynchronous Earth-orbit (GEO) spacecraft 10, which includes a single liquid apogee engine (LAE) 30 used for orbit transfer. The LAE 30 is positioned on the aft end of the spacecraft, on a panel 22 that fits within the end of a cylindrical core member 20. The LAE 30 can be a high-thrust engine, for example having a thrust level of 100 pound-force (lbf). To provide an LAE backup, multiple (e.g., four) hydrazine bipropellant thrusters (HBTs) 40 are mounted on the base panel 12 external to the cylindrical core member 20. The HBTs 40 can be low-thrust engines, for example having a thrust level of 5 lbf. These thrusters may be fired continuously with limited off-pulsing for attitude control. Also, to provide high thrust for on-orbit maneuvering, two monopropellant reaction engine assemblies (REAs) 32 may be provided, for example on the panel 22 that fits within the end of the cylindrical core member 20. The REAs 32 can be high-thrust REAs, for example having a thrust level of 45 pound-force (lbf). In addition, multiple monopropellant reaction engine assemblies (REAs) 50 can be provided for attitude control of the spacecraft 10. Each REA 50 can be a low-thrust REA, for example having a thrust level of 5 pound-force (lbf).

The above-described arrangement has various limitations. First, if the LAE 30 fails, the low thrust of the HBT 40 may significantly extend the orbit transfer (four HBTs 40 firing provide 20% of the LAE thrust) and delay the start of the mission. Furthermore, positioning the HBTs 40 outside the cylindrical core member 20 increases the propellant line lengths, complicates the thermal control, and can result in physical and plume interferences with other components. Also, the high thrust REAs 32 used for mission orbit maneuvering are not sufficiently fuel-efficient to support future velocity change (ΔV) requirements. Finally, the system is not scalable, meaning that the arrangement is not readily adaptable to provide higher or lower thrust.

An improved propulsion system that addresses these limitations is described herein. An exemplary propulsion system uses multiple high efficiency DV thrusters to provide fault-tolerant and scalable high thrust for orbit transfer and maneuvering over life. The preferred thrust level of such high efficiency engines is about 25 lbf, although other thrust levels are possible, for example 20 to 50 lbf. This thrust range if referred to as "medium thrust." By using multiple (e.g., four or more) medium thrust engines, a scalable "high thrust" capability can be provided. Furthermore, if a single high efficiency engine fails, a subset of the remaining engines can be fired to provide the required thrust. Hence the system is fault-tolerant. Because the high efficiency engines may be bipropellant thrusters, higher fuel efficiency is provided as compared to systems that use monopropellant REAs for high thrust mission orbit maneuvering.

Figure 2:
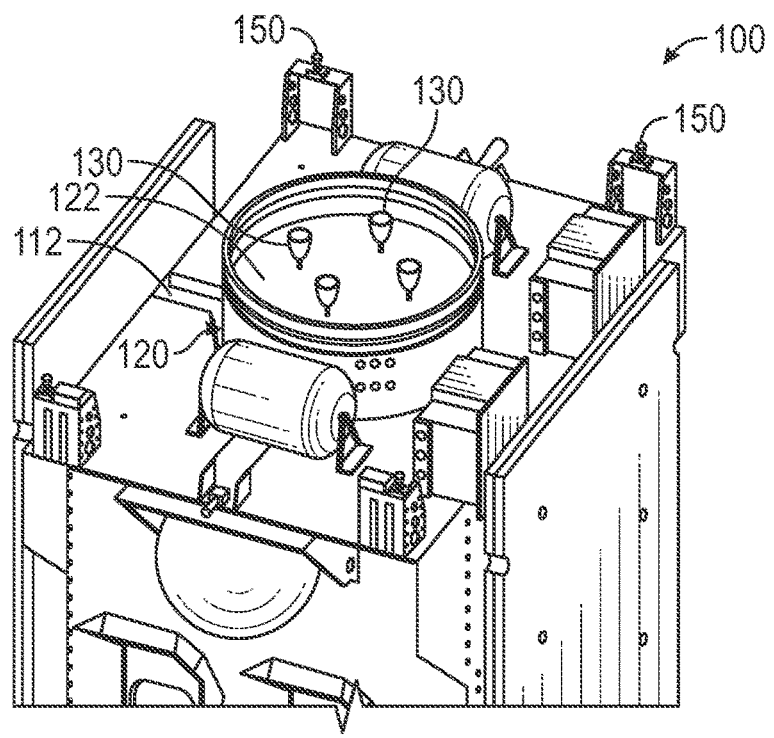
FIG. 2 shows a perspective view of an exemplary GEO spacecraft.

FIG. 2 shows an exemplary GEO spacecraft 100. As shown in FIG. 2, multiple (e.g., four) DV thrusters 130 are mounted on a core panel 122 at an end of a cylindrical core member 120, close to the separation plane. The cylindrical core member 120 is mounted to a base panel 112 of the GEO spacecraft 100 and can be a standard size used for GEO spacecraft, for example with a diameter of about 47 inches, which matches a diameter of a launch vehicle's 1194 mm interface.

The DV thrusters 130 can each have medium thrust capability. Each DV thruster 130 can have a thrust level between about 20 lbf and 50 lbf, for example 25 lbf. Together, the DV thrusters can have a combined high thrust capability. In some embodiments, each of the DV thrusters 130 can have a same, common first thrust level as each other. The DV thrusters 130 can be high efficiency engines, such as bipropellant thrusters. The DV thruster s 130 can be operated primarily for velocity changes.

As further shown in FIG. 2, multiple REAs 150 are mounted to the base panel 112 and outside the cylindrical core member 120. The REAs 150 can each have low thrust capability. Each REA 150 can have a thrust level between about 1 lbf and 10 lbf, for example 5 lbf. In some embodiments, each of the REAs 150 can have a same, common second thrust level that is lower than the first thrust level of the DV thrusters 130. The REAs 150 can be monopropellant thrusters. The REAs 150 can be operated primarily for attitude control.

The DV thrusters 130 of the GEO spacecraft 100 can be used to generate spacecraft accelerations and velocity changes in a direction nominally parallel to the spacecraft longitudinal axis. For a spacecraft mass in the range of 2000 to 4000 kg, and a DV thruster thrust level of 25 lbs, accelerations from about 23 to 11 milli-g's may be achieved by firing four DV thrusters 130. For this mass range and DV thruster thrust level, accelerations from about 34 to 17 milli-g's may be achieved by firing six DV thrusters 130. Other accelerations may be achieved with a granularity of 5.7 to 2.8 milli-g's, depending on the spacecraft mass and the number of DV thrusters fired for a specific maneuver.

All DV thrusters 130 can be positioned within the cylindrical core member 120 (e.g., to the core panel 122), and all REAs 150 can be positioned outside the cylindrical core member 120 (e.g., to the base panel 112). Accordingly, all higher thrust, bipropellant engines (i.e., DV thrusters 130) can be within the cylindrical core member 120, and all lower thrust, monopropellant engines (i.e., REAs 150) can be outside the cylindrical core member 120. By mounting all DV thrusters 130 within the cylindrical core member 120, manufacturing time and cost is reduced because the propellant lines need only extend to a mounting panel at an end of the cylindrical core member 120, rather than outside the cylindrical core member 120 to the extremes of the base panel 112. Because the cylindrical core member 120 and the core panel 122 are thermally controlled as a unit, separate thermal treatments (e.g., blankets, heaters, thermistors, temp-control circuits) that would be required for the propellant lines feeding base-panel mounted thrusters are eliminated. Furthermore, the consolidation of DV thrusters 130 within the cylindrical core member 120 allows additional space to be reserved on the base panel 112 for other components.

The DV thrusters 130 can be arranged in a symmetrical pattern to bracket the spacecraft center of mass, which can be intersected by a centerline of the GEO spacecraft 100. The separation between adjacent DV thrusters 130 can be sufficient to provide a nominal moment arm and accommodate heat shields that permit firing of all or some thrusters simultaneously. In particular, each DV thruster 130 can provide a moment arm when fired. For example, the DV thrusters 130 can be aligned to have thrust vectors that are parallel to each other, such that the firing of each DV thruster 130 provides a moment arm, and the firing of all DV thrusters 130 or a combination of certain combinations of DV thrusters 130 provides a nominal zero moment arm. The thrusters can be fired continuously, with one or more DV thrusters 130 "off-pulsed" to compensate for the nominal disturbance torque, as described further herein.

In at least one configuration, the DV thrusters 130 can be arranged with orientations so their thrust vectors pass through the spacecraft center of mass, with each DV thruster 130 providing a nominal zero moment arm. In a failure case of a GEO spacecraft 100 having this configuration, instead of being restricted to firing two DV thrusters 130, more (e.g., three) can be fired. The DV thrusters 130 need not be off-pulsed. Instead, the active DV thrusters 130 can be fired continuously and the low thrust REAs 150 can be used to provide full three-axis attitude control.

It will be recognized that the GEO spacecraft 100 can include various other components, such as systems for command and control, power management, and communications. The GEO spacecraft 100 can include a solar array, where the solar array is used to re-charge a battery to drive components, including control systems.

Figure 3:
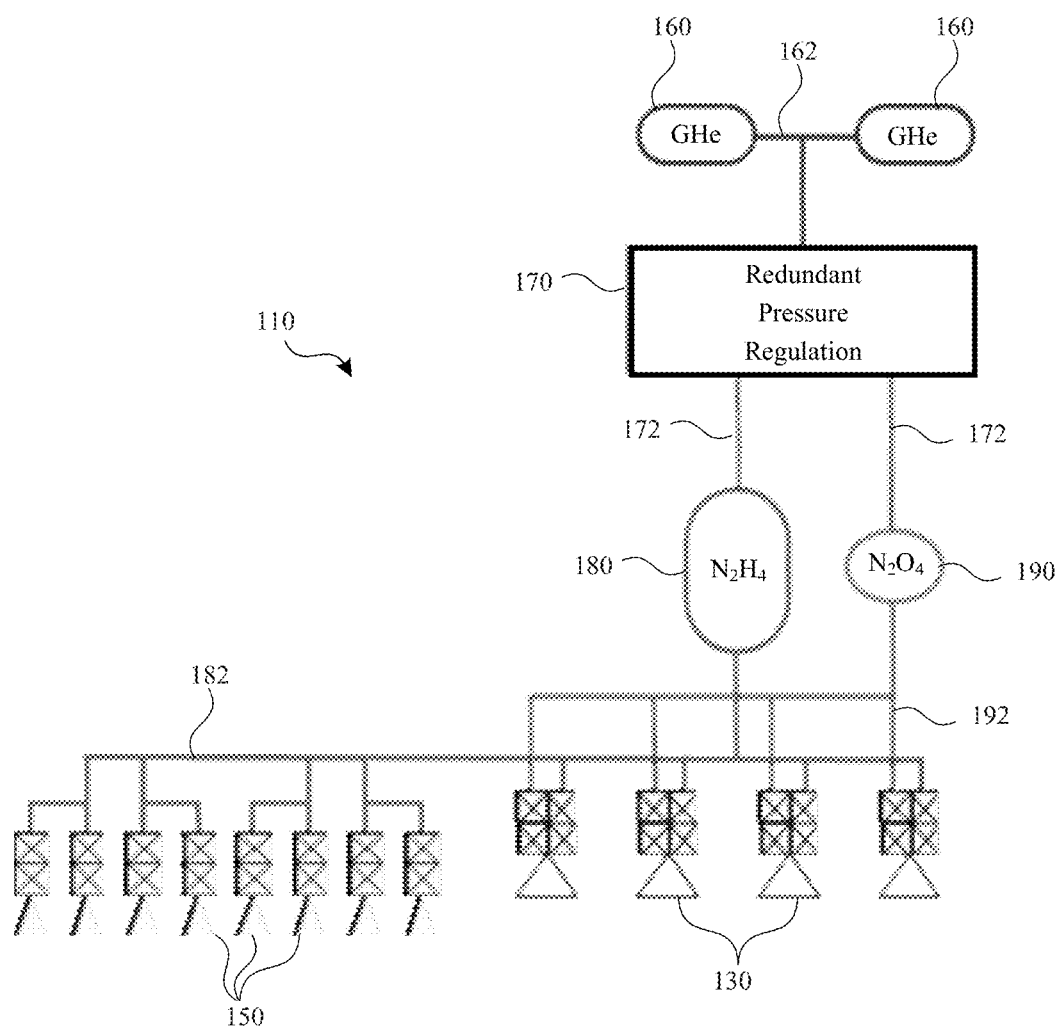
FIG. 3 shows a block diagram of an exemplary propulsion system for a GEO spacecraft.

FIG. 3 shows a block diagram of a propulsion system 110 for a GEO spacecraft, such as the GEO spacecraft 100 of FIG. 2. As shown in FIG. 3, a pressurant (e.g., gaseous helium) is provided from a pressurant tank 160 to the propellant tanks during a pressure-regulated phase of operation. For example, the pressurant tank 160 provides the pressurant along a pressurant line 162 to a regulator 170, which provides the pressurant at regulated pressure along regulated pressurant lines 172 to each of a fuel tank 180 and an oxidizer tank 190. The pressurant line 162 can include on or more manifolds. Each of the pressurant line 162 and regulated pressurant lines 172 can include a pressure relief valve, the pressure relief valves allowing for backflow of pressurant if a pressure threshold is exceeded.

The fuel tank 180 can contain a fuel, such as hydrazine ($N_2H_4$). The oxidizer tank 190 can contain an oxidizer, such as dinitrogen tetroxide ($N_2O_4$). A fuel line 182 fluidly connects the fuel tank 180 to the DV thrusters 130 and the REAs 150. The fuel line 182 can include one or more manifolds. An oxidizer line 192 also fluidly connects the oxidizer tank 190 to the DV thrusters 130 so the DV thrusters 130 can operate with bipropellant-based thrust. The oxidizer line 192 can include one or more manifolds. Each of the pressurant tank 160, the fuel tank 180, and the oxidizer tank 190 can be cylindrical and further include spherical end caps. Each of the fuel line 182 and oxidizer line 192 can include a pressure relief valve, the pressure relief valves allowing for backflow of propellant if a pressure threshold is exceeded.

In some embodiments, no oxidizer line 192 fluidly connects the oxidizer tank 190 to the REAs 150. Instead, the REAs 150 can operate with monopropellant-based thrust. It will be recognized that the propulsion system 110 may use other types propellants and corresponding thrusters. Furthermore, a bipropellant chemical reaction of the DV thrusters 130 can be enhanced by electrical augmentation.

The DV thrusters 130 are designed to tolerate propellant exposure over a standard mission (e.g., 15 years). Currently available thrusters require periodic "clearing firings" to prevent the formation of iron nitrate in stainless steel valves. To mitigate this, the DV thrusters 130 can use titanium valves, which do not interact with the propellants. For operational flexibility, the engines can be compatible with a propulsion system blow-down mode of operation. Blow-down mode is typically entered at the end of the orbit transfer, when a pressurant manifold is isolated from the propellant tanks. In a blow-down mode, the inlet pressures may vary between 250 and 200 psi. Furthermore, the DV thrusters 130 can operate with a mixture ratio from 0.70 to 0.95. Also, the engines can be off-pulsed for attitude control, with a typical duty cycle operating range (% of time thruster is on each control cycle) from 80 to 100%. This is in contrast to standard DV thrusters that cannot be pulsed and can only operate over a narrow range of pressure and mixture ratio. Design attributes of exemplary DV thrusters 130 are further described in Table 1 below.

TABLE 1

DV Thruster Design

| Parameter | Capability |
| --- | --- |
| Thrust | 25 lbf at 240 psia inlet pressure (ox and fuel) and 20° C. propellant |
| temperature | |
| Specific Impulse | 320 or greater at 230 psia inlet pressure, 20° C. propellant temperature, firing steady state |
| On-Time | Greater than 80,000 seconds |
| Pulsing Capability | Ability to off-pulse at duty cycles no less than 80% for up to 40,000 pulses |
| Mass | Less than 4 kg |
| Mixture Ratio | Nominal 0.85 for transfer orbit operations Nominal 0.92 for on-orbit operations Ability to operate over a range of mixture ratios from 0.7-0.95 |
| Length | Less than 16 inches from the ends of the propellant tubes to the end of the nozzle |

The DV thrusters 130 can use titanium valves, with two in series to provide redundancy against leakage. Each valve contains a single actuator and two flow paths/seals, one for oxidizer and one for fuel. The DV thrusters 130 can include an injector with a geometry so that distribution of propellants is optimized to achieve the required performance, including off-pulsing, over the inlet pressure range. The DV thrusters 130 can include a combustion chamber of a material that requires no coating on the inside of the chamber. The chamber is designed to withstand the 80,000 seconds of firing time. The DV thrusters 130 can include a nozzle that provides an expansion ratio of at least 300:1.

Figure 4:
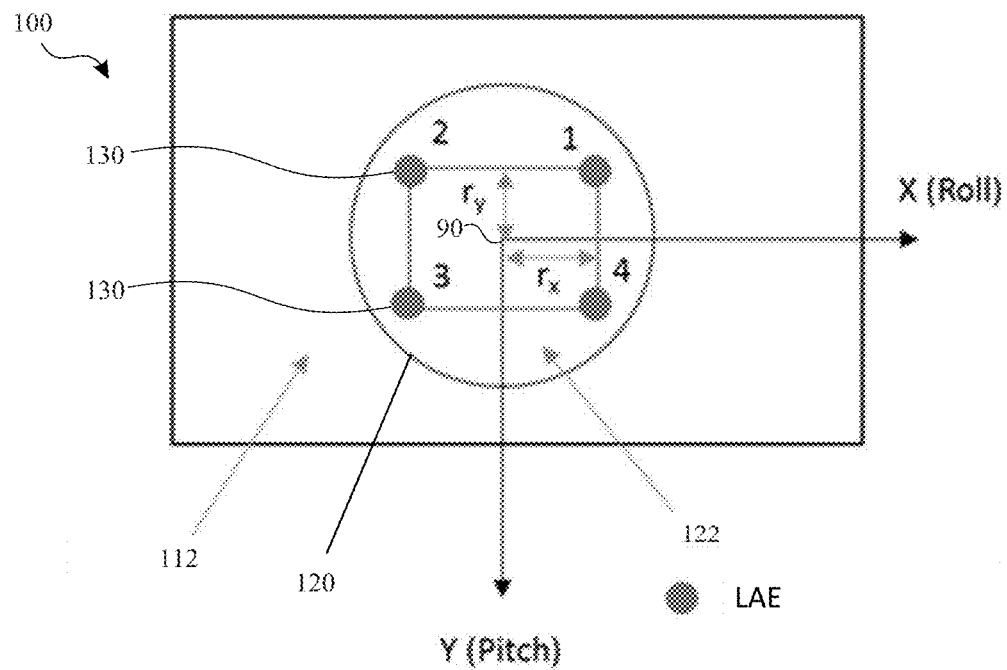
FIG. 4 shows a simplified view of an exemplary GEO spacecraft.
Figure 5:
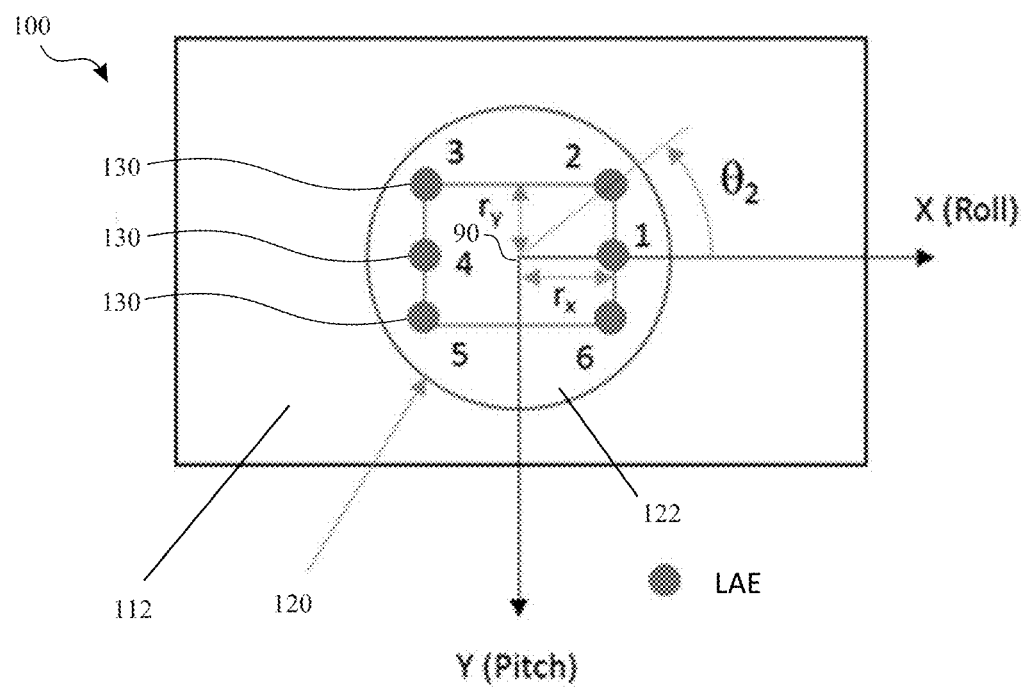
FIG. 5 shows a simplified view of an exemplary GEO spacecraft.

FIGS. 4 and 5 show example arrangements of DV thrusters 130 within the cylindrical core member 120 of the GEO spacecraft 100. The DV thrusters 130 can be provided on the vertices of a rectangle, defined by positions $r_x$ and $r_y$ along the x (roll) and y (pitch) axes. The cylindrical core member 120 surrounds a central axis of the GEO spacecraft 100, the central axis intersecting a center of mass 90 of the GEO spacecraft 100 and a centroid of the rectangle (i.e., intersection of the roll and pitch axes). The DV thrusters 130 are offset from the central axis, with opposing pairs of the DV thrusters 130 being symmetrically opposite each other across the central axis.

The thrust axis of each DV thruster 130 is along the z (pitch) axis (into the page of FIGS. 4 and 5, forming a right-hand triad with x and y axes). The center of mass 90 can be on the spacecraft centerline and coincident with the center of the rectangle. However, if the center of mass 90 is offset in the x and y directions, the rectangle can be shifted accordingly, to minimize the roll and pitch disturbances when the DV thrusters 130 fire. This improves fuel efficiency by reducing the off-pulsing required (deviation from 100% duty cycle), which results in a higher specific impulse.

It will be recognized that other arrangements of DV thrusters 130 are contemplated. For example, the DV thrusters 130 can be positioned an equal distance or different distances from a central axis. By further example, the DV thrusters 130 can be positioned an equal distance or different distances away from adjacent DV thrusters 130. The arrangement of the DV thrusters 130 can be defined by any shape connecting the DV thrusters 130.

As shown in FIG. 4, an arrangement of four DV thrusters 130 can be provided with the DV thrusters 130 on the vertices of a rectangle, defined by positions $r_x$ and $r_y$ along the x (roll) and y (pitch) axes. Where all DV thrusters 130 are operational (i.e., in a failure-free case), all four DV thrusters 130 can fire, with up to two off-pulsed such that the roll and pitch disturbances are nulled. Where one or more DV thrusters 130 have failed (i.e., the failure case), a diagonal pair of operational DV thrusters 130 (e.g., 1 and 3 or 2 and 4) fire, with one of the operational DV thrusters 130 being off-pulsed. Other thrusters (e.g., REAs) can also be pulsed for attitude control. Those with skill in the art will recognize that the placement of the DV thrusters 130 may be optimized for fuel efficiency if the direction and magnitude of a center of mass shift is known.

As shown in FIG. 5, an arrangement of six DV thrusters 130 can be provided with the DV thrusters 130 along vertices and/or sides of a rectangle, defined by positions $r_x$ and $r_y$ along the x (roll) and y (pitch) axes. In this example, two additional DV thrusters 130 are placed along the roll axis to augment the four-DV thruster arrangement described above. An alternative arrangement is possible where the DV thrusters 130 are located on a circle of radius r, each with a clock angle theta (θ) from the spacecraft roll axis. The clock angle may be selected to provide equal angular separation between DV thrusters 130 (e.g., 60° separation for the six-DV thruster configuration). Where all DV thrusters 130 are operational (i.e., in a failure-free case), all six DV thrusters 130 fire, with up to three DV thrusters 130 off-pulsed to null the roll and pitch disturbance. For this case, the off-pulse control may be determined to minimize the maximum off-pulse duty cycle (minimize the maximum deviation from 100% duty cycle), thereby improving fuel efficiency. Where one or more DV thrusters 130 have failed (i.e., the failure case), four remaining DV thrusters 130 fire, with two off-pulsed to null the roll and pitch disturbance. For example, given that the DV thrusters 130 include DV thrusters 1, 2, 3, 4, 5, and 6 as shown in FIG. 5, if DV thruster 1 fails, then pairs 2, 5 and 3, 6 are fired, and if DV thruster 2 fails, then pairs 1, 4 and 3, 6 fire.

It will be recognized that any number of DV thrusters can be provided and operated. As such, the propulsion system is scalable to meet a broad range of needs for a given GEO spacecraft. At least some of the DV thrusters can be offset from the central axis of the spacecraft. The DV thrusters can be operated based on the known arrangement to achieve velocity changes and provide attitude adjustments.

Accordingly, the improved propulsion system described herein uses multiple high efficiency engines to provide fault-tolerant and scalable high thrust for orbit transfer and maneuvering over life. Advantageously, if a single high efficiency engine fails, a subset of the remaining engines can be fired to provide the required thrust. The implementation of multiple high efficiency DV thrusters, such as bipropellant engines, reduces reliance on less efficient engines, such as monopropellant engines.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order.

Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A spacecraft comprising:
   a base panel;
   a cylindrical core member mounted to the base panel;
   multiple DV thrusters mounted within the cylindrical core member, each of the multiple DV thrusters being directed in a direction on a side of the spacecraft;
   multiple reaction engine assemblies mounted to the base panel outside the cylindrical core member, wherein each of the DV thrusters has a thrust level that is greater than a thrust level of each of the reaction engine assemblies, each of the multiple reaction engine assemblies being directed in a same direction as the direction of each of the multiple DV thrusters and on a same side of the spacecraft as the side of each of the multiple DV thrusters;
   a fuel tank;
   an oxidizer tank;
   a fuel line fluidly connecting the fuel tank to the DV thrusters and the reaction engine assemblies; and
   an oxidizer line fluidly connecting the oxidizer tank to the multiple DV thrusters, wherein no line connects the oxidizer tank to the multiple reaction engine assemblies.

2. The spacecraft of claim 1, wherein the fuel tank contains hydrazine ($N_2H_4$).

3. The spacecraft of claim 1, wherein the oxidizer tank contains dinitrogen tetroxide ($N_2O_4$).

4. The spacecraft of claim 1, wherein the multiple DV thrusters comprises at least four DV thrusters.

5. The spacecraft of claim 1, wherein a thrust level of each of the DV thrusters is between 20 pound-force and 50 pound-force.

6. The spacecraft of claim 1, wherein a thrust level of each of the reaction engine assemblies is between 1 pound-force and 10 pound-force.

7. The spacecraft of claim 1, wherein the DV thrusters are bipropellant engines, and the reaction engine assemblies are monopropellant engines.

8. The spacecraft of claim 1, wherein each of the multiple DV thrusters has a common first thrust level, and each of the multiple reaction engine assemblies has a common second thrust level.

9. The spacecraft of claim 1, wherein the cylindrical core member surrounds a central axis of the spacecraft, the central axis intersecting a center of mass of the spacecraft, and the multiple DV thrusters are offset from the central axis, wherein opposing pairs of the multiple DV thrusters are symmetrically opposite each other across the central axis.

10. The spacecraft of claim 9, wherein the multiple DV thrusters have thrust vectors parallel to each other such that, when fired, each provides a moment arm to the spacecraft.

11. The spacecraft of claim 9, wherein each of the multiple DV thrusters has a thrust vector that passes through the center of mass of the spacecraft such that, when fired, each provides a nominal zero moment arm to the spacecraft.

12. A spacecraft comprising:
   a base panel;
   a cylindrical core member mounted to the base panel;
   multiple bipropellant engines mounted within the cylindrical core member, each of the multiple bipropellant engines being directed in a direction on a side of the spacecraft;
   multiple monopropellant engines mounted to the base panel outside the cylindrical core member, each of the multiple monopropellant engines being directed in a same direction as the direction of each of the multiple bipropellant engines and on a same side of the spacecraft as the side of each of the multiple bipropellant engines;
a fuel tank;
an oxidizer tank;
a fuel line connecting the fuel tank to the bipropellant engines and the monopropellant engines; and
an oxidizer line connecting the oxidizer tank to the bipropellant engines, wherein no line connects the oxidizer tank to the multiple reaction engine assemblies.

13. The spacecraft of claim 12, wherein a thrust level of each of the bipropellant engines is between 20 pound-force and 50 pound-force, and a thrust level of each of the monopropellant engines is between 1 pound-force and 10 pound-force.

14. The spacecraft of claim 12, wherein the fuel line and the oxidizer line connect to the bipropellant engines via the cylindrical core member.

15. A method of maneuvering a spacecraft, the method comprising:
operating multiple DV thrusters mounted within a cylindrical core member of a spacecraft, wherein the multiple DV thrusters comprise offset DV thrusters that are offset from a central axis that intersects a center of mass of the spacecraft;
when all of the DV thrusters are operational, controlling an attitude of the spacecraft by:
firing at least two of the offset DV thrusters; and
off-pulsing at least one of the offset DV thrusters; and
when one of the DV thrusters is not operational:
firing a diagonal pair of operational ones of the offset DV thrusters; and
off-pulsing an additional operational one of the offset DV thrusters.

16. The method of claim 15, wherein the controlling the attitude of the spacecraft further comprises operating at least one of multiple reaction engine assemblies mounted to a base panel outside the cylindrical core member, wherein each of the DV thrusters has a thrust level that is greater than a thrust level of each of the reaction engine assemblies.

17. The method of claim 15, wherein a thrust level of each of the DV thrusters is between 20 pound-force and 50 pound-force, and a thrust level of each of the reaction engine assemblies is between 1 pound-force and 10 pound-force.

* * * * *